United States Patent
Foster

[11] 3,924,170
[45] Dec. 2, 1975

[54] BANG-BANG SERVO SYSTEM
[75] Inventor: Alan Foster, Hitchin, England
[73] Assignee: International Computers Ltd., Hertfordshire, England
[22] Filed: July 31, 1973
[21] Appl. No.: 384,311

[52] U.S. Cl. .................. 318/561; 318/604
[51] Int. Cl.² ........................... G05B 13/00
[58] Field of Search ........... 318/561, 597, 603, 604

[56] References Cited
UNITED STATES PATENTS

| | | | |
|---|---|---|---|
| 3,209,338 | 9/1965 | Romvari | 318/561 X |
| 3,241,015 | 3/1966 | Allen | 318/561 X |
| 3,277,355 | 10/1966 | Troutman et al. | 318/561 |
| 3,412,300 | 11/1968 | Westenskow | 318/561 |
| 3,668,494 | 6/1972 | Agin | 318/561 X |
| 3,729,668 | 4/1973 | Brette | 318/561 |
| 3,731,177 | 5/1973 | Commander et al. | 318/561 |

*Primary Examiner*—T. E. Lynch
*Attorney, Agent, or Firm*—Misegades, Douglas & Levy

[57] ABSTRACT

A servo control apparatus for controlling a paper tractor drive motor is described in which the current supply to the motor is controlled digitally so that for short movements a braking current is applied for the second half of the movement and for larger movements the braking current is applied at a predetermined distance before the required stopping point.

1 Claim, 4 Drawing Figures

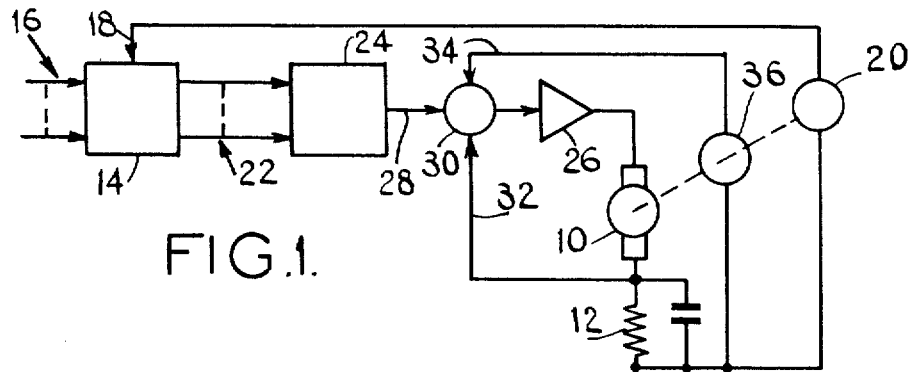
FIG.1.
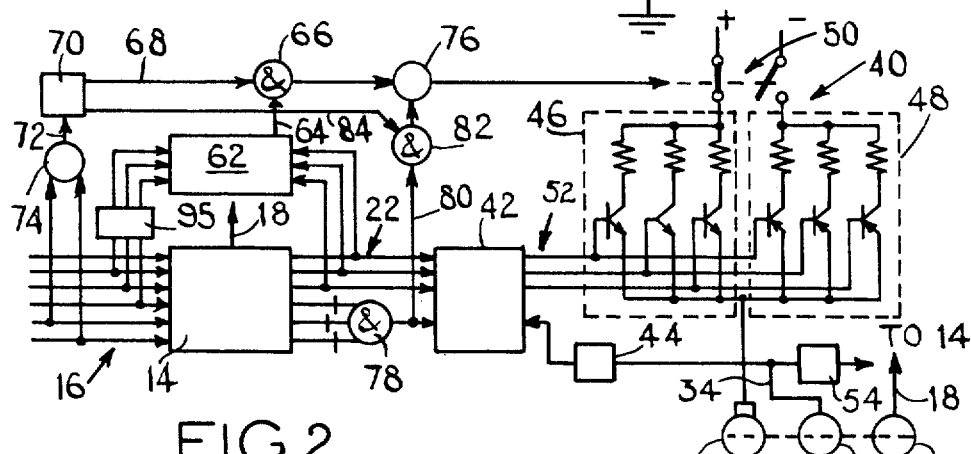
FIG.2.
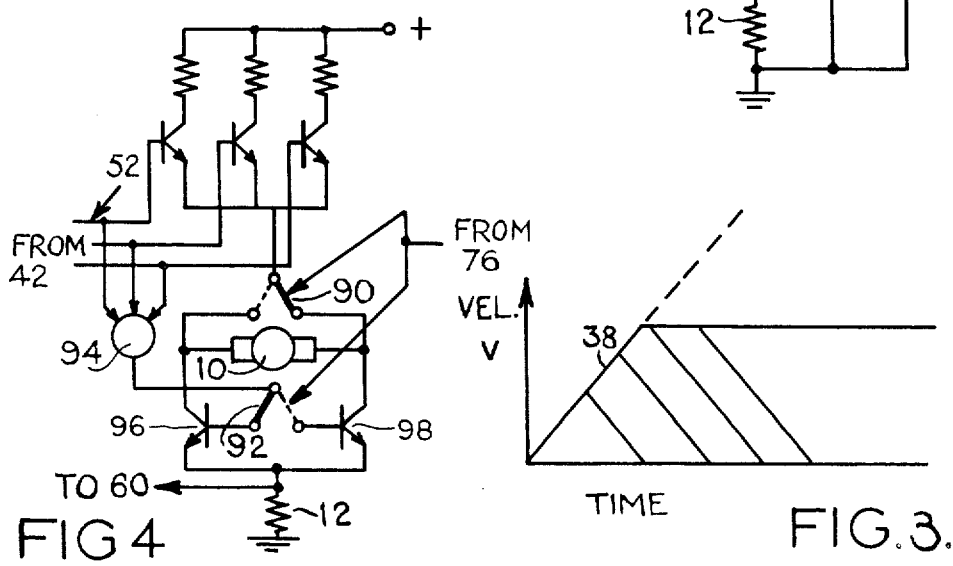
FIG 4.
FIG.3.

BANG-BANG SERVO SYSTEM

BACKGROUND OF THE INVENTION

The invention relates to servo systems and particularly to driving paper tractors of high speed printers such as are used in computer installations.

In one known system a demand signal, say for a paper advance of one or more lines, is applied to set a counter which will then be decremented as progress is made to the desired position. The drive applied to the paper tractors is made dependent on the counter state at any time subject to velocity limitations and this is generally done by analog techniques. In one proposal, the counter feeds a digital-to-analog converter whose output is mixed with a motor feedback signal and a velocity dependent signal to provide an input signal for an amplifier supplying a motor drive output signal. Commercially available converters and amplifiers are designed with a view to obtaining highly linear responses and this tends to make them expensive.

I believe, however, that there is no great necessity for highly linear signals for driving paper tractors, especially using a system in which control is achieved by reversing the polarity of a constant current drive halfway through a required advance, or at a predetermined distance from the target position if there is a maximum velocity limitation.

SUMMARY OF THE INVENTION

According to the invention there is provided a servo control system for a paper tractor drive motor, comprising a counter settable according to a demand signal representative of a desired advance of the driven mechanism, means for progressively resetting the counter according to the motion of the driven mechanism, means for sensing predetermined drive conditions, and digital logic means responsive to the counter state and a pulse signal from the sensing means to provide a digital output operative to selectively enable corresponding branches of a drive current weighting network.

In effect, this means that a digitally determined fraction of an available electric supply is applied directly to the drive motor without requiring a linear response amplifier, and the necessary modification functions for the drive current are carried out in digital logic means. This is an attractive solution for a printer that is a computer peripheral as its other controls will be digital. Any required clocking control signals will be readily available or derivable, and the desired digital operations will use techniques and circuitry compatible with other control functions.

BRIEF DESCRIPTION OF THE DRAWING

One embodiment of the invention will now be described by way of example with reference to the accompanying drawings in which;

FIG. 1 shows a prior analog type servo control;

FIG. 2 shows a digital type servo control embodying this invention and,

FIG. 3 shows idealised velocity/time diagrams useful in explaining the servo control operation, and FIG. 4 shows a modified motor current supply for a servo system.

DESCRIPTION OF PREFERRED EMBODIMENT

FIG. 1 shows a drive motor 10 connected to ground by a current limiting series resistor 12. The drive motor 10 is intended to drive the paper tractors of a high speed line printer where paper advances may be required over a given number of lines which may even be of variable spacing if desired. To achieve that, an advance from the present position is specified as a binary number in which each space corresponds to a predetermined count, say eight. Where desired then, advances can be made to multiples of fractions, say eighths, of a "normal" line space. A counter 14 is shown for receiving and being set by such a digital representation of a desired advance when its inputs 16 are appropriately energised.

Once set, the counter 14 is decremented by pulses on a further input 18 which pulses represent eighths of a line space and conveniently generated by a shaft encoder 20 for the drive shaft of the motor 10. The outputs 22 of the counter 14 thus always represent the distance by which the paper still has to be advanced in order to satisfy the original demand.

A motor drive signal is derived in accordance with the outputs 22 of the counter 14 using a digital-to-analog converter 24 and an analog amplifier 26 fed by the output 28 of the converter via a signal mixer 30 also responsive to a feedback signal from the motor 10 over line 32 and a velocity representative signal on line 34 from a tachogenerator 36 conveniently also on the drive shaft of the motor 10.

In FIG. 2 elements equivalent to those of FIG. 1 are given the same references. As can be seen, this embodiment of the invention replaces the digital-to-analog converter 24 and amplifier 26 of FIG. 1 by a digitally operated drive current weighting network 40, and replaces the mixer 30 by a logic arrangement 42 responsive to the counter outputs and to a pulse signal from indicator 44 representative of maximum permitted velocity being reached or exceeded.

The drive current weighting network 40 is shown to include two sets 46, 48 of parallel weighting resistor paths for positive and negative polarity current flow, respectively. Each such resistor path also includes the emitter-collector path of an appropriately poled transistor whose conduction state is controlled by the energisation condition of its base electrode. Any suitable switch such as an electronic circuit, is used to ensure that only one direction of drive current can be applied at any one time, and such a switch is indicated diagrammatically at 50. The drive current magnitude applied at any one time depends on which of the weighting resistors of the set concerned pass current and this is determined by the outputs 52 of the logic block 42. It is preferred for the weighting resistors of each set to have a binary order significance for the current they pass when the associated transistors are energised, and each pair of resistor branches of corresponding significance in the two sets 46 and 48 are enabled by the same one of the output lines 52 from the logic block 42. For three resistor branches per set, selected singly or in combination by the three logic block outputs 52, seven possible levels of drive current can be selected for each polarity.

It is convenient for electric supply levels of corresponding digital significance to have substantially the same value for both polarities. However, in order to stop the advance accurately at the desired position it may be advantageous to provide a further set of resistor circuit branches offering a fine control of braking, that is negative polarity, drive current at a relatively low level. This could be achieved as a separate set of resistive branches similarly coupled to the logic outputs 52 with supply to the first, or coarse control, set 48 being cut off when the advance reaches a predetermined state. This state corresponds with a position very close to that desired and can be indicated directly from the state of the counter 14 or, and preferably, indirectly from sensing a particular level of back emf in the motor 10. A satisfactory indication of the latter can be derived from a lower limit detector 54 connected to the tachogenerator 36.

The effect of such a further set of resistor branches might alternatively be achieved by connecting further resistors in each of the resistance branches of the negative polarity set 48 and arranging that these shall be short-circuited by controllable bridging paths except when the above mentioned predetermined state exists. Such bridging paths would include switching devices such as further transistors jointly controlled as to their condition from the detector 54.

In this way, the effective supply voltage for the drive current depends on the logic block outputs on lines 52 and the drive current polarity depends on the state of the switch 50.

For an advance of the mechanism, i.e. paper tractors driven by the motor 10, the initial requirement will normally be for maximum drive supply voltage across the motor. The logic block 42 is therefore operative normally to energise its outputs so as to render all the transistors in the resistive branches conductive. The logic block 42 includes a three stage counter with the outputs of the three stages connected through AND gates to the lines 52. Initially this counter is set to energise all of the lines 52 to render all the resistive branches of network 46 conductive. This causes the motor 10 to accelerate and upon reaching the required maximum velocity an upper limit indicator 44 controls the production of pulses to decrement the counter until only sufficient of the resistive branches are energised to maintain the motor speed at approximately the required maximum speed.

Maintaining a constant current through the motor 10 will cause a substantially linearly increasing velocity V of the driven shaft and thus the paper transport tractors. This is shown by the line 38 of FIG. 3. In practice, of course, the rise from zero velocity will not be instantaneously of the slope shown. It is generally necessary to limit the velocity to a maximum and this is done according to the output of the tachogenerator 36. Attaining maximum velocity will usually require a movement as indicated by the signals on the lines 16 of more than two lines of normal spacing, particularly where such a desired advance involves a reversal of the motor drive current as exemplified by the oppositely sloped lines extending from the line 38 and representing, schematically, the relative periods of forward and reversed drive currents for, respectively, advances of one, two, three and four lines. Unless maximum velocity is reached during a paper feed operation, polarity reversal is arranged to take place at the halfway point. If maximum velocity is reached, polarity reversal is arranged to take place a fixed distance from the end of the desired advance.

In the case where a desired advance does not involve reaching the maximum permitted velocity, the polarity reversal of drive current for braking purposes is most conveniently achieved by sensing when the half way point of the advance is achieved. Such a desired advance will be less than two normal line spaces, which, in the present example, requires an input count of sixteen to the counter 14. Only the four least significant counter inputs 16 will be concerned and half of the input value will be represented, in binary, by a shift of one digit place towards the least significant end of the binary word. A comparator 62 is therefore shown for comparing the three least significant of the counter outputs 22 with the second to fourth least significant of the counter inputs 16. To make the comparison, these inputs 16 are used to set a group of bistables 95 and the states of the bistables 95 are compared with the three least significant outputs of counter 14. When identity of the compared values is reached, due to the counter being decremented, the comparator output 64 is energised.

The comparator output 64 is connected to one input of an AND gate 66 which is enabled by one output 68 of a bistable device 70. The bistable device 70 is normally unset and in this state it puts an enabling energisation on its output 68, which changes to a disabling energisation bistable device 70 is unset by an output 72 of an OR gate 74, indicating that one of the higher significance (fifth and above) counter inputs 16 is energised.

The output of the AND gate 66 is used to operate the switch 50 from a normal state, in which positive drive current is applied to the motor 10, to a state in which negative drive current is applied. This is done via an OR gate 76. The output of the AND gate 66 will, of course, only be energised in the case where the input count for the desired advance is sixteen or less and then only when the counter output is at half that input value.

If the desired advance does involve reaching a maximum velocity, the bistable device 70 will be set by the OR gate 74 output to the state in which it disables the AND gate 66. It is necessary now to reverse the drive current polarity after passing a point at a predetermined distance from the end of the desired advance, say one line space therefrom. One line space is equivalent to a counter state of eight and movement past this point can be detected by an AND gate 78 for detecting an all zero condition on all of those of the counter outputs 22 that are above the third significant one. The AND gate 78 should, of course, provide an input to the OR gate 76 only when the AND gate 66 is disabled. To do this, the output 80 of the AND gate 78 is connected to a further AND gate 82 which is enabled by a second output 84 of the bistable device 70 which carries the enabling output when the bistable 70 is in the set state.

The output of the AND gate 78 is also used as an enabling signal for three AND gates in the logic block to cause the lower significant outputs 22 from the counter 14 to be passed to the outputs 52 and hence control the applied drive current voltage. The output from AND gate 78 is intended to provide an enabling signal to those AND gates in the block 42 which are connected in the outputs of the three stage counter within the block 42. If the number of counter outputs determinative of the predetermined position at which drive current is reversed is different from the number for which control of applied drive current voltage is made directly from the counter outputs, one or more further coincidence gates will be required to provide the necessary control signals which in the present example are represented by the signal on the output of AND gate 78.

An alternative, preferred, arrangement for driving the motor is shown in FIG. 4 and requires only a single positive supply terminal rather than the two polarities shown in FIG. 2. Only a single set of resistive branches is shown for both acceleration and coarse braking, though it will generally be necessary to short out part of each resistance for acceleration. The direction of current through the motor 10 is changed by operating the two switches 90 and 92 together from the positions shown by solid lines to those indicated by dashes. This switching from acceleration to braking will be controlled by the output of the OR gate 76 shown in FIG. 2, and, as with the switch 50, the switches 90 and 92 will most conveniently be embodied electrically in a single circuit arrangement.

The switch 92 is supplied with the outputs 52 of the logic block 42 of FIG. 2 via an OR gate 94. If any one or more of these is energised to render the corresponding resistive branch transistor conductive, then the energising signal will be passed through the OR gate 94 to one or the other of transistors 96 and 98 that cooperate with the switch 90 to determine the direction of current flow through the motor 10.

Additional resistors and/or branches for fine control of braking can also be provided with this arrangement.

The transistor switches in the resistor branches can, of course, also be replaced by any other suitable switchable elements to provide the drive currents to the motor 10.

Where provision is made for the additional fine control of braking of the motor 10 by further resistors, as mentioned above, the "coarse" sets 46 and 48 may be selected by the counter outputs representing the third, fourth and fifth powers of two, whilst the fine set is selected by those representing, say, $2^0$, $2^1$ and $2^2$. In particular if the fine set is to be ineffective during the "coarse" control phase, the resistor branches of the two sets may overlap in the significance of their selecting outputs, say, they may share the value $2^2$, i.e. have the coarse set selected by the $2^2$, $2^3$ and $2^4$ stage. It is not essential for a fine control set to include the same number of branches as the coarse control set, though it is expected that it generally will.

Provision will be made for the logic block 42 and the bistable device 70 to be reset to their normal conditions immediately prior to each loading of the counter inputs 16 with a demand for a desired advance, e.g. all outputs 52 energised to cause conduction and output 68 energised to enable the AND gate 66.

I claim:

1. Servo control apparatus for a drive motor operable to drive a paper tractor, including:
    a counter settable to register an initial digital count corresponding to a required paper tractor advance expressed as increments of movement distance;
    means for progressively decrementing the count registered by the counter in response to accomplishment of increments of actual movement;
    a motor drive current supply arranged to provide acceleration and deceleration drive current to the motor including a network of parallel current paths respectively arranged to provide current having a mutual binary power relationship and of opposite polarities, the polarities corresponding to acceleration and deceleration drive conditions respectively; and
    control means including means arranged to respond to the count registered during the movement to produce control signals; a comparator responsive to the initial digital count and to the previously decremented registered count to produce, if the required advance is less than a predetermined magnitude, a first changeover signal when the registered count indicates that half the required advance has been completed; and a gating control arrangement effective, if the required advance is equal to said predetermined magnitude and if the required advance is greater than said predetermined magnitude, to disable the comparator and to produce a second changeover signal when the registered count indicates that a predetermined distance before completion of the advance has been reached, said control signals being operative to select the current paths in the network to be energized singly and in combination to provide a drive current of required magnitude and said first and second changeover signals being operative to alter the polarities of the drive current from an acceleration drive condition to a deceleration drive condition.

* * * * *